United States Patent
Schaffner

(10) Patent No.: US 9,088,348 B2
(45) Date of Patent: Jul. 21, 2015

(54) SYSTEM AND METHOD FOR OBTAINING FREQUENCY AND TIME SYNCHRONIZATION IN A WIDEBAND COMMUNICATION SYSTEM

(75) Inventor: Terry M. Schaffner, Warrenville, IL (US)

(73) Assignee: Digi International Inc., Minnetonka, MN (US)

( * ) Notice: Subject to any disclaimer, the term of this patent is extended or adjusted under 35 U.S.C. 154(b) by 1368 days.

(21) Appl. No.: 11/764,579

(22) Filed: Jun. 18, 2007

(65) Prior Publication Data

US 2008/0309543 A1    Dec. 18, 2008

(51) Int. Cl.
 *H04B 1/00*   (2006.01)
 *H04B 1/7183*  (2011.01)
 *H04B 1/7163*  (2011.01)
 *H04B 1/69*   (2011.01)

(52) U.S. Cl.
 CPC .......... *H04B 1/7183* (2013.01); *H04B 1/71635* (2013.01); *H04B 1/71637* (2013.01); *H04B 2001/6912* (2013.01)

(58) Field of Classification Search
 CPC ................... H04B 1/7183; H04B 2001/6912
 USPC .................. 375/139, 354–355, 295, 316, 324
 See application file for complete search history.

(56) References Cited

U.S. PATENT DOCUMENTS

| | | | |
|---|---|---|---|
| 4,532,603 A | 7/1985 | Gerard | |
| 6,396,866 B1 * | 5/2002 | Upton et al. | 375/139 |
| 6,493,405 B1 | 12/2002 | Olaker et al. | |
| 6,943,405 B2 | 9/2005 | Bryant et al. | |
| 7,068,704 B1 * | 6/2006 | Orr | 375/139 |
| 7,177,343 B1 * | 2/2007 | Citta et al. | 375/139 |
| 7,245,930 B1 * | 7/2007 | Vishwanath et al. | 455/502 |
| 2003/0022651 A1 | 1/2003 | Bannasch et al. | |
| 2005/0163201 A1 | 7/2005 | Krasner | |
| 2006/0114747 A1 | 6/2006 | Hentati et al. | |
| 2008/0165833 A1 | 7/2008 | Lee | |
| 2008/0310481 A1 | 12/2008 | Schaffner | |

FOREIGN PATENT DOCUMENTS

| EP | 1599001 A1 | 11/2005 |
|---|---|---|
| WO | WO-03092183 A2 | 6/2003 |

OTHER PUBLICATIONS

European Application Serial No. 08252093.3, Office Action Mailed Jun. 15, 2009, 1 pg.
European Application Serial No. 08252093.3, filed on Jun. 18, 2008, European Search Report mailed Oct. 10, 2008, 7 pgs.

(Continued)

*Primary Examiner* — Freshteh N Aghdam
(74) *Attorney, Agent, or Firm* — Fogg & Powers LLC

(57) ABSTRACT

This document discusses, among other things, a system and method of measuring and correcting for frequency offset in wideband signals of bandwidth X within a communications system. A synchronization signal is generated and transmitted, wherein generating a synchronization signal includes generating a first chirp signal that sweeps a portion of bandwidth X and generating a second chirp signal to sweep approximately the same portion of bandwidth X but in the opposite direction. The synchronization signal is received at a receiver. The receiver then detects a first offset as a function of the first chirp signal and a second offset as a function of the second chirp signal and calculates the frequency offset as a function of the first and second offsets.

42 Claims, 4 Drawing Sheets

(56) References Cited

OTHER PUBLICATIONS

European Application Serial No. 08252099.0, Office Action Mailed Jun. 15, 2009, 1 pg.

European Application Serial No. 08252099.0, Search Report mailed Oct. 6, 2008, 7 pgs.

Hengstler, S., et al., "A novel chirp modulation spread spectrum technique for multiple access", *2002 IEEE Seventh International Symposium on Spread Spectrum Techniques and Applications*, (2002), 73-77.

Kowatsch, M., et al., "A Spread-Spectrum Concept Combining Chirp Modulation and Pseudonoise Coding", *IEEE Transactions on Communications, 31(10)*, (Oct. 1983), 1133-1142.

Springer, A., et al., "Spread Spectrum Communications Using Chirp Signals", *IEEE/AFCEA EUROCOMM 2000. Information Systems for Enhanced Public Safety and Security.*, (2000), 166-170.

U.S. Appl. No. 11/764,597, Final Office Action mailed Sep. 15, 2010, 13 pgs.

U.S. Appl. No. 11/764,597, Non Final Office Action mailed Feb. 28, 2011, 13 pgs.

U.S. Appl. No. 11/764,597, Response filed Jul. 8, 2010 to Non Final Office Action mailed Feb. 8, 2010, 13 pgs.

U.S. Appl. No. 11/764,597, Non-Final Office Action mailed Feb. 8, 2010, 11 pgs.

U.S. Patent and Trademark Office, "Decision on Appeal", from U.S. Appl. No. 11/764,597, Oct. 3, 2014, pp. 1-8, Published in: US.

U.S. Patent and Trademark Office, "Office Action", from U.S. Appl. No. 11/764,597, Dec. 18, 2014, pp. 1-23, Published in: US.

U.S. Patent and Trademark Office, "USPTO Miscellaneous Communication Re: Dependent Claim 25", "From U.S. Appl. No. 11/764,597", May 8, 2015, pp. 15, Published in: US.

U.S. Patent and Trademark Office, "Notice of Allowance", "From U.S. Appl. No. 11/764,597", Apr. 10, 2015, pp. 117, Published in: US.

* cited by examiner

SYSTEM AND METHOD FOR OBTAINING FREQUENCY AND TIME SYNCHRONIZATION IN A WIDEBAND COMMUNICATION SYSTEM

TECHNICAL FIELD

This patent document pertains generally to data communications, and more particularly, but not by way of limitation, to a system and method for obtaining frequency and time synchronization in wideband communication systems.

BACKGROUND

In a chirp-modulated communication system the offset of the carrier frequencies between the transmitter and receiver appears as a time offset at the receiver. Current chirp-modulated communication systems do not attempt to determine the actual frequency offset, and, therefore, the symbol timing at the receiver may be misaligned with the received data. This produces a non-optimal partial correlation or intersymbol interference (ISI) that degrades the sensitivity of the receiver. Additionally, if the receiver has no knowledge of the frequency offset it must track the signal based upon the demodulated data in order to maintain synchronization. However, if the frequency offset is known at the receiver, it can use a much more robust means of tracking the signal. If the symbol clock and carrier frequency are derived from the same oscillator at the transmitter and receiver, the frequency offset is proportional to the time drift. Thus, the frequency offset information can be used to track the incoming signal. This method of tracking is much more robust in high interference or low signal to noise ratio environments.

What is needed is a system and method for reducing ISI and enhancing receiver performance in a communication system.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

As noted above, current chirp-modulated communication systems do not measure and attempt to remove the frequency offset of the received signal prior to the correlation with the expected chirp waveform. Without reducing the frequency offset, the time offset error induced by the frequency offset may significantly degrade the performance of the receiver. In addition, with a known frequency offset at the receiver a more robust time tracking algorithm can be employed.

Figure 1:
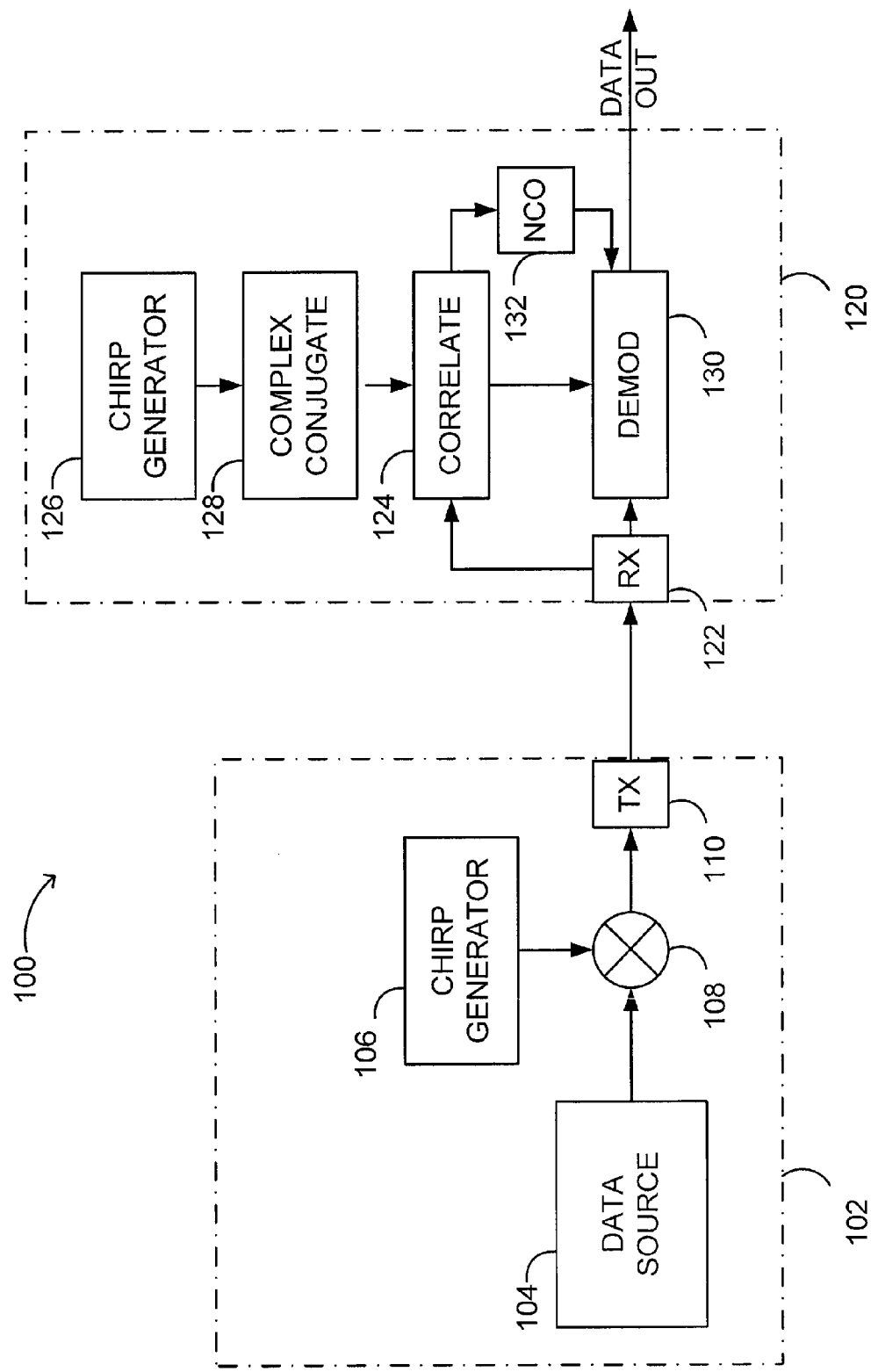
FIG. 1 illustrates a communication system according to the present invention.

A system and method for reducing the effects of frequency offset in spread spectrum and other wideband signals is shown in FIG. 1. In FIG. 1, system 100 includes a transmitter 102 and a receiver 120. Transmitter 102 includes a data source 104, a chirp generator 106, a combiner 108 and a transmit circuit 110. Data source 104 generates a stream of data. Chirp generator 106 generates a chirp signal that is combined with the stream of data from data source 104 using combiner 108 in a manner known in the art.

Figure 2:
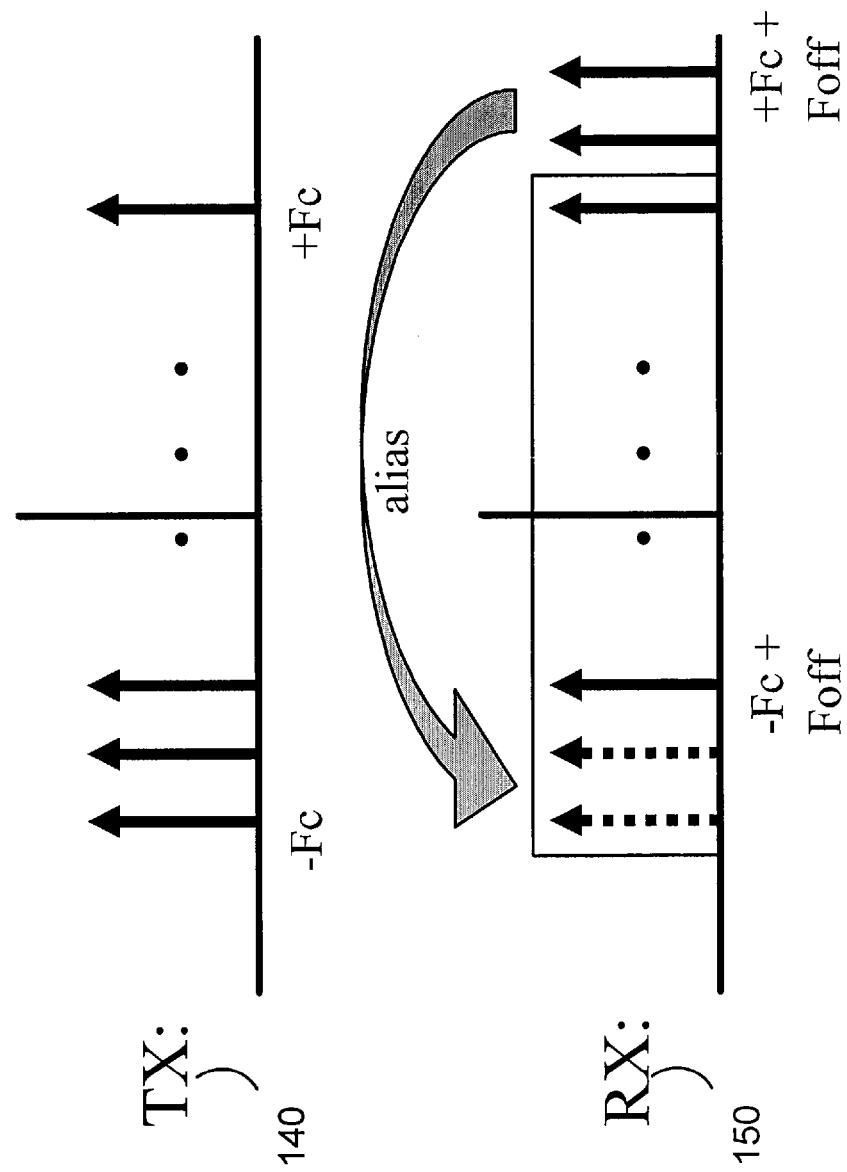
FIG. 2 is a frequency domain representation of the transmitted and received synchronization signals.

A frequency domain representation of a chirp signal transmitted by transmitter 102 is shown as transmit signal 140 in FIG. 2. In one embodiment, the chirp signal used in transmitter 102 is a complex sinusoid that rapidly sweeps across the frequency bandwidth of the signal. In one such embodiment, each frequency is occupied for only a single chirp sample.

At receiver 120, the received signal 150 may be shifted in frequency due to the offset between the transmitter 102's local oscillator and the local oscillator in receiver 120, as well as any Doppler effects. The correlation of received signal 150 with the transmitted chirp is illustrated in FIG. 2. Despite the presence of a large frequency offset, the received signal is perfectly correlated to the transmitted signal. Note that the received signal's higher frequency components will alias and correlate with the transmitted signal. Also note that a positive frequency offset has translated into a time offset.

Figure 3:
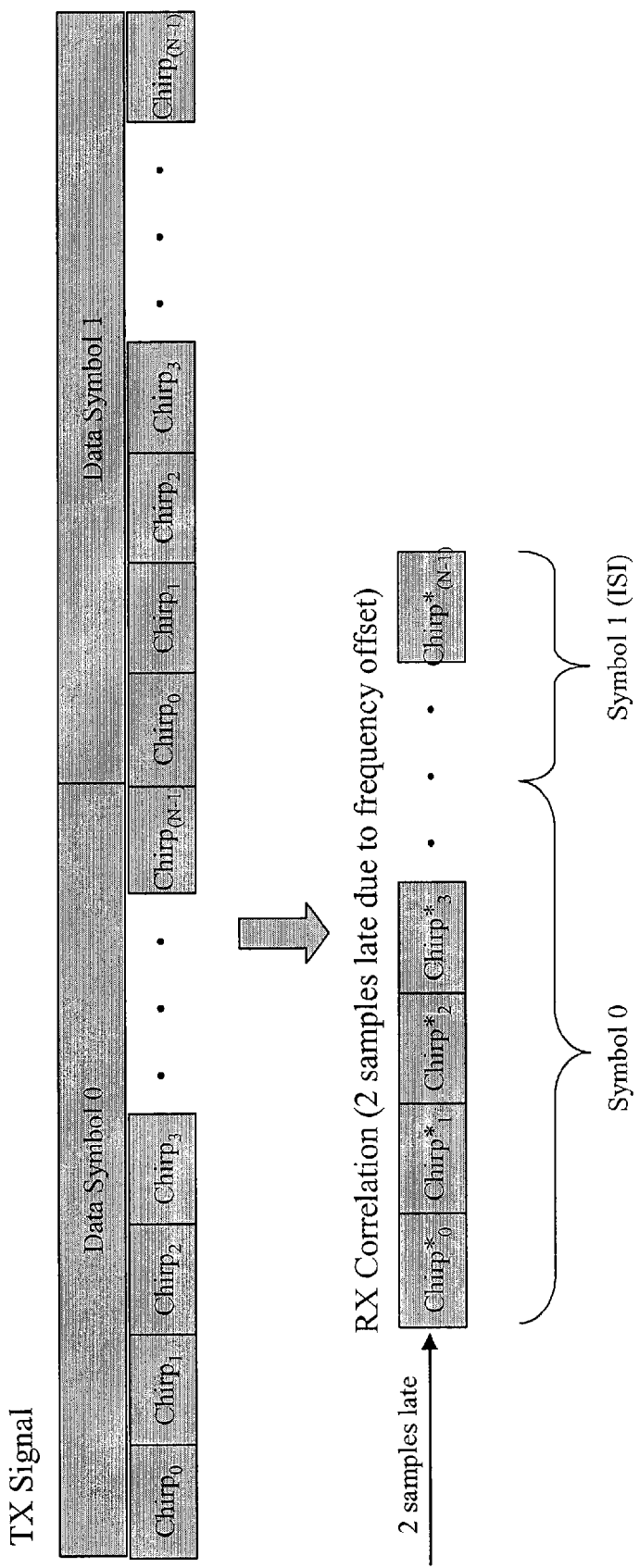
FIG. 3 depicts the intersymbol interference that occurs due to the frequency offset of the received signal.

If the chirps are modulated with information data, there will be intersymbol interference (ISI) introduced due to the misalignment of the receive chirp correlations with respect to the actual symbol boundaries. This is due to the property of the chirp waveform of translating a frequency offset into an apparent time offset. This phenomenon is illustrated in FIG. 3.

It should be noted that, if a SAW filter is used to perform the chirp correlation instead of a digital FFT method, the ISI would not occur but there would still be a degradation due to an incomplete correlation. This is what is meant by the term "partial correlation".

In one embodiment, transmitter 102 transmits an unmodulated sequence of chirps as a synchronization preamble. As noted in "SYSTEM AND METHOD FOR TRANSMITTING AND DETECTING SPREAD SPECTRUM SIGNALS," U.S. patent application Ser. No. 11/764,597, filed herewith, the description of which is incorporated within by reference, it is possible to achieve coherent detection of a signal beyond the system's coherency bandwidth through the use of chirp modulation for a data-unmodulated sync or preamble.

In order to reduce receiver degradations due to inaccurate symbol timing, the frequency offset must be removed from the received signal. The chirp modulation, however, effectively hides the underlying frequency offset, making it difficult to distinguish the true timing offset from the time offset produced by the frequency offset. System 100 provides a means of determining the frequency offset, and, therefore, the time offset. It does this by transmitting an unmodulated sequence of chirps frequency swept in the opposite direction as those used in the sync preamble. This approach is illustrated in FIG. 4.

Figure 4:
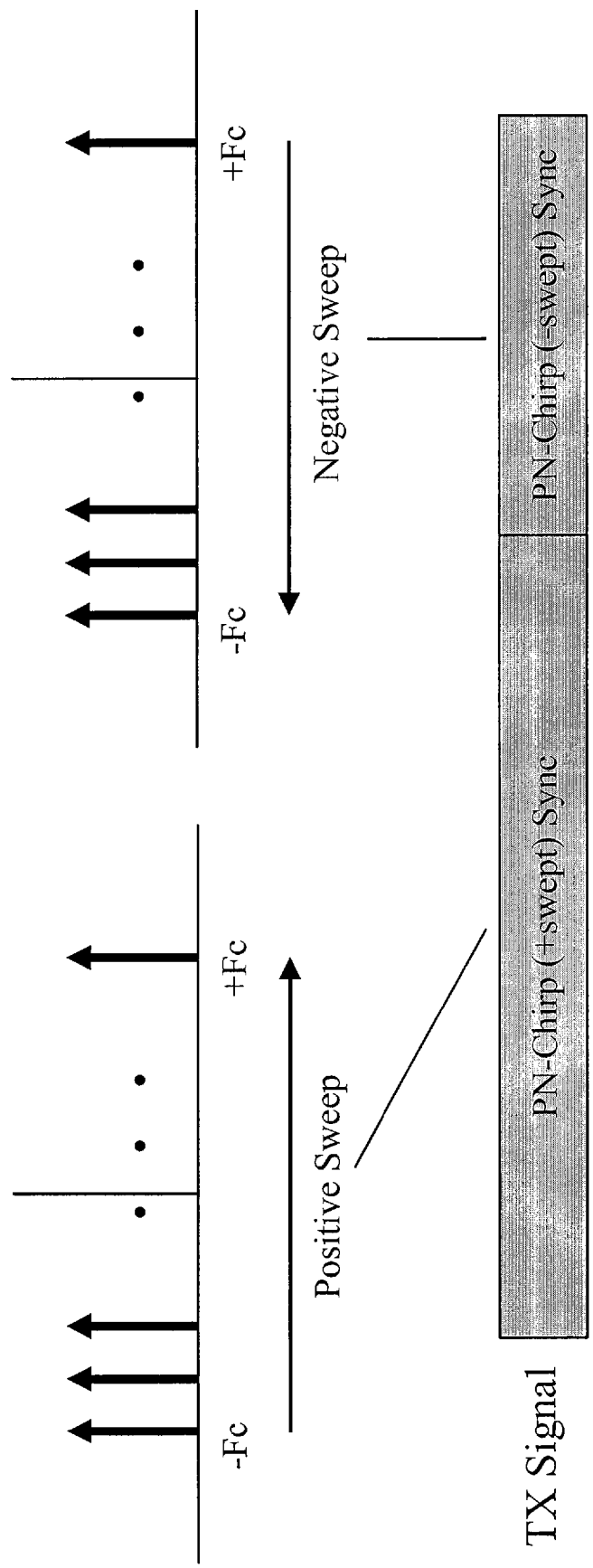
FIG. 4 illustrates a synchronization signal formed by concatenating to the sync preamble an unmodulated sequence of chirps that are frequency swept in a direction opposite to the chirps that are part of the sync preamble.

FIG. 4 shows an unmodulated sequence of chirps frequency swept in the opposite direction as those used in the synchronization preamble. At the receiver, a positive frequency offset results in an early timing offset with positively swept chirps and a late timing offset with negatively swept chirps. The true timing offset is halfway between these two offsets. Likewise, the frequency offset is calculated based upon the difference between the positively and negatively swept chirps. The optimum symbol timing at the receiver can be maintained throughout the transmitted data duration by tracking the time offset based upon the calculated frequency offset and the phase estimates from the demodulator.

In one embodiment, frequency offset is reduced through the use of an NCO (Numerically Controlled Oscillator). The elimination of the frequency offset also results in the elimination of the ISI induced by the frequency offset.

Returning to FIG. 1, receiver 120 includes a receiver circuit 122, a digital correlator 124, a chirp generator 126, a complex conjugate calculator 128, a demodulator 130 and a Numerically Controlled Oscillator (NCO) 132. Complex conjugate calculator 128 calculates the complex conjugate of a chirp signal generated by chirp generator 126. Digital correlator and offset correction 124 takes the complex conjugate of the chirp signal generated by chirp generator 126 and uses it to detect the transmitted synchronization signal. This transmission can be initial signaling for packet-based data transmissions or for access channels.

In the embodiment shown NCO 132 eliminates the frequency offset detected by receiver 120. The elimination of the frequency offset also results in the elimination of the ISI induced by the frequency offset.

Current chirp-modulated communication systems do not attempt to determine the actual frequency offset, and, therefore, the symbol timing at the receiver may be misaligned with the received data. This produces a non-optimal partial correlation or intersymbol interference (IS) that degrades the sensitivity of the receiver. The above described system and method eliminates this partial correlation or ISI by providing a method for measuring the frequency offset of the received chirp-modulated signal.

It is to be understood that the above description is intended to be illustrative, and not restrictive. For example, the above-described embodiments (and/or aspects thereof) may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72 (b), which requires that it allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment.

What is claimed is:

1. A method of measuring frequency offset in wideband signals of bandwidth X within a communications system having a coherency time constant of T, comprising:
    generating a synchronization signal during a preamble of a data frame, wherein generating the synchronization signal includes:
        generating a first chirp signal that sweeps a portion of bandwidth X; and
        generating a second chirp signal that sweeps approximately the same portion of bandwidth X in a direction opposite to the first chirp signal;
    transmitting the synchronization signal;
    receiving a wideband signal at a receiver;
    generating a receiver chirp signal in the receiver;
    detecting a first offset as a function of the first chirp signal and the receiver chirp signal;
    detecting a second offset as a function of the second chirp signal and the receiver chirp signal; and
    calculating the frequency offset as a function of the first and second offsets; and
    tracking a time offset over the data frame based on the calculated frequency offset.

2. The method of claim 1, wherein receiving a wideband signal includes detecting the synchronization signal, wherein detecting includes:
    generating a detection signal from the receiver chirp signal, wherein the detection signal is a complex conjugate of at least a portion of the synchronization signal;
    correlating the received wideband signal with the detection signal; and
    indicating when the synchronization signal is detected within the wideband signal.

3. The method of claim 1, wherein each chirp signal sweeps linearly across the portion of bandwidth X such that each frequency is occupied for only a single chirp sample during each sweep.

4. The method of claim 1, wherein generating a synchronization signal further includes modulating a pseudo-noise (PN) sequence with the synchronization signal.

5. The method of claim 4, wherein the PN sequence has a length M, wherein M is less than T.

6. The method of claim 4, wherein each chirp signal sweeps linearly across the portion of bandwidth X such that each frequency is occupied for only a single chirp sample during each sweep.

7. The method of claim 1, wherein the wideband signal is a spread spectrum signal.

8. A method of correcting frequency offset in wideband signals of bandwidth X within a communications system having a coherency time constant of T, comprising:
    generating a synchronization signal during a preamble of a data frame, wherein generating the synchronization signal includes:
        generating a first chirp signal that sweeps a portion of bandwidth X; and
        generating a second chirp signal that sweeps approximately the same portion of bandwidth X in a direction opposite to the first chirp signal;
    transmitting the synchronization signal;
    receiving a wideband signal at a receiver;
    generating a receiver chirp signal in the receiver;
    detecting a first offset as a function of the first chirp signal and the receiver chirp signal;
    detecting a second offset as a function of the second chirp signal and the receiver chirp signal;

calculating the frequency offset as a function of the first and second offsets;

removing the calculated frequency offset; and tracking a time offset over the data frame based on the calculated frequency offset.

9. The method of claim 8, wherein receiving a wideband signal includes detecting the synchronization signal, wherein detecting includes:

generating a detection signal from the receiver chirp signal, wherein the detection signal is a complex conjugate of at least a portion of the synchronization signal;

correlating the received wideband signal with the detection signal; and indicating when the synchronization signal is detected within the wideband signal.

10. The method of claim 8, wherein each chirp signal sweeps linearly across the portion of bandwidth X such that each frequency is occupied for only a single chirp sample during each sweep.

11. the method of claim 8, wherein generating a synchronization signal further includes modulating a pseudo-noise (PN) sequence with the synchronization signal.

12. The method of claim 11, wherein the PN sequence has a length M, wherein M is less than T.

13. The method of claim 11, wherein each chirp signal sweeps linearly across the portion of bandwidth X such that each frequency is occupied for only a single chirp sample during each sweep.

14. The method of claim 8, wherein the wideband signal is a spread spectrum signal.

15. A method of determining time offset of wideband signals of bandwidth X within a communications system having a coherency time constant of T, comprising:

generating a synchronization signal during a preamble of a data frame, wherein generating the synchronization signal includes:

generating a first chirp signal that sweeps a portion of bandwidth X; and generating a second chirp signal that sweeps approximately the same portion of bandwidth X in a direction opposite to the first chirp signal;

transmitting the synchronization signal;

receiving a wideband signal at a receiver;

generating a receiver chirp signal in the receiver;

detecting a first offset as a function of the first chirp signal and the receiver chirp signal;

detecting a second offset as a function of the second chirp signal and the receiver chirp signal;

calculating the time offset as a function of the first and second offsets; and tracking the time offset over the data frame.

16. The method of claim 15, wherein receiving a wideband signal includes detecting the synchronization signal, wherein detecting includes:

generating a detection signal from the receiver chirp signal, wherein the detecting signal is a complex conjugate of at least a portion of the synchronization signal;

correlating the received wideband signal with the detection signal; and indicating when the synchronization signal is detected within the wideband signal.

17. The method of claim 15, wherein each chirp signal sweeps linearly across the portion of bandwidth X such that each frequency is occupied for only a single chirp sample during each sweep.

18. A transmitter, comprising:

a synchronization signal generator, wherein the synchronization signal generator generates a synchronization signal during a preamble of a data frame, wherein the synchronization signal includes a first chirp signal and a second chirp signal, wherein the second chirp signal sweeps in a direction opposite to the first chirp signal;

a data source;

one or more modulators, wherein the modulators modulate data from the data source to form a data-modulated wideband signal of bandwidth X and wherein the modulators modulate the synchronization signal to form a modulated synchronization signal that sweeps a portion of bandwidth X; and a transmitter circuit connected to the one or more modulators, wherein the transmitter circuit transmits the modulated synchronization signal and the data-modulated wideband signal at different times.

19. The transmitter of claim 18, wherein each chirp signal is a linear frequency chirp signal.

20. The transmitter of claim 18, wherein the chirp signals, when modulated, sweep linearly across the portion of bandwidth X such that's each frequency is occupied for only a single chirp sample during each sweep.

21. The transmitter of claim 18, wherein the transmitter transmits the modulated synchronization signal as a preamble to the data modulated wideband signal.

22. The transmitter of claim 18, wherein the synchronization signal generator further includes a pseudo-noise generator, wherein the pseudo-noise generator generates a PN sequence of length M, wherein the PN sequence is modulated by the chirp signal to form the synchronization signal.

23. The transmitter of claim 22, wherein the transmitter is designed to operate in a system having a coherency time constant of T and wherein M is chosen to be less than T.

24. The transmitter of claim 22, wherein each chirp signal is a linear frequency chirp signal.

25. The transmitter of claim 22, wherein each chirp signal, when modulated, sweeps linearly across the portion of bandwidth X such that each frequency is occupied for only a single chirp sample during each sweep.

26. The transmitter of claim 18, wherein the wideband signal is a spread spectrum signal.

27. A receiver for use in a communications system having a coherency time constant of T and a transmitter that transmits a wideband signal including a synchronization signal modulated to sweep a portion of a bandwidth X, wherein the synchronization signal includes a first chirp signal and a second chirp signal in a preamble of a data frame, wherein the second chirp signal sweeps in a direction opposite to the first chirp signal, the receiver comprising:

a receiver circuit for receiving a wideband signal of bandwidth X;

a chirp generator circuit for generating a receiver chirp signal;

a frequency offset circuit, wherein the frequency offset circuit detects a first offset as a function of the first chirp signal and the receiver chirp signal, detects a second offset as a function of the second chirp signal and the receiver chirp signal, and calculates a frequency offset as a function of the first and second offsets;

a frequency offset correcting circuit, wherein the frequency offset correcting circuit modifies the wideband signal to remove the calculated frequency offset; and a demodulator connected to the synchronization signal detector, wherein the demodulator recovers data from the wideband signal after the frequency offset is removed;

wherein the receiver is configured to track a time offset over the data frame based on the calculated frequency offset.

28. The receiver of claim 27, wherein each chirp signal is a linear frequency chirp signal.

29. The receiver of claim 27, wherein each chirp signal sweeps linearly across the portion of bandwidth X such that each frequency is occupied for only a single chirp sample during each sweep.

30. The receiver of claim 27, wherein the synchronization signal is transmitted as a preamble.

31. The receiver of claim 27, wherein the receiver further includes a synchronization signal detector, connected to the receiver circuit, wherein the synchronization signal detector detects the synchronization signal within the wideband signal, wherein the synchronization signal detector includes:
    a detection signal generator, wherein the detection signal generator generates a detection signal from the receiver chirp signal, wherein the detection signal is a complex conjugate of at least a portion of the synchronization signal; and
    a correlator, wherein the correlator correlates the received wideband signal with the detection signal and indicates when the synchronization signal is detected.

32. The receiver of claim 31, wherein the synchronization signal includes a pseudo-noise (PN) sequence modulated by the chirp signal, wherein the PN sequence is of length M, wherein M is less than a coherency time constant.

33. The receiver of claim 32, wherein the chirp signal is a linear frequency chirp signal.

34. The receiver of claim 32, wherein the chirp signal sweeps linearly across the portion of bandwidth X such that each frequency is occupied for only a single chirp sample during each sweep.

35. A communication system having a coherency time constant T, comprising:
    one or more transmitters, wherein each transmitter includes:
        a synchronization signal generator, wherein the synchronization signal generator generates a synchronization signal during a preamble of a data frame, wherein the synchronization signal includes a first chirp signal and a second chirp signal, wherein the second chirp signal sweeps in a direction opposite to the first chirp signal;
        a data source;
        one or more modulators, wherein the modulators modulate data from the data source to form a data-modulated wideband signal of bandwidth X and wherein the modulators modulate the synchronization signal to form a modulated synchronization signal that sweeps a portion of bandwidth X; and
        a transmitter circuit connected to the one or more modulators, wherein the transmitter circuit transmits the modulated synchronization signal and the data-modulated wideband signal at different times; and
    one or more receivers, wherein the receivers include:
        a receiver circuit for receiving a wideband signal of bandwidth X;
        a chirp generator circuit for generating a receiver chirp signal;
        a frequency offset circuit, wherein the frequency offset circuit detects a first offset as a function of the first chirp signal and the receiver chirp signal, detects a second offset as a function of the second chirp signal and the receiver chirp signal, and calculates a frequency offset as a function of the first and second offsets;
        a frequency offset correcting circuit, wherein the frequency offset correcting circuit modifies the wideband signal to remove the calculated frequency offset; and
        a demodulator connected to the synchronization signal detector, wherein the demodulator recovers data from the wideband signal after the frequency offset is removed;
    wherein the one or more receivers are configured to track a time offset over the data frame based on the calculated frequency offset.

36. The system of claim 35, wherein each chirp signal is a linear frequency chirp signal.

37. The system of claim 35, wherein each chirp signal, when modulated, sweeps linearly across the portion of bandwidth X such that each frequency is occupied for only a single chirp sample during each sweep.

38. The system of claim 35, wherein the modulated synchronization signal is transmitted as a preamble.

39. The system of claim 35, wherein the receiver further includes a synchronization signal detector, connected to the receiver circuit, wherein the synchronization signal detector detects the synchronization signal within the wideband signal, wherein the synchronization signal detector includes:
    a detection signal generator, wherein the detection signal generator generates a detection signal from the receiver chirp signal, wherein the detection signal is a complex conjugate of at least a portion of the synchronization signal; and
    a correlator, wherein the correlator correlates the received wideband signal with the detection signal and indicates when the synchronization signal is detected.

40. The system of claim 39, wherein the synchronization signal includes a pseudo-noise (PN) sequence modulated by the chirp signal, wherein the PN sequence is of length M, wherein M is less T.

41. The system of claim 40, wherein each chirp signal is a linear frequency chirp signal.

42. The system of claim 40, wherein each chirp signal, when modulated, sweeps linearly across the portion of bandwidth X such that each frequency is occupied for only a single chirp sample during each sweep.

* * * * *